US010553240B2

(12) United States Patent
Kayama

(10) Patent No.: US 10,553,240 B2
(45) **Date of Patent: *Feb. 4, 2020**

(54) CONVERSATION EVALUATION DEVICE AND METHOD

(71) Applicant: Yamaha Corporation, Hamamatsu-shi, Shizuoka-Ken (JP)

(72) Inventor: Hiraku Kayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,218

(22) Filed: Jan. 29, 2019

(65) Prior Publication Data

US 2019/0156857 A1 May 23, 2019

Related U.S. Application Data

(63) Continuation of application No. 15/609,163, filed on May 31, 2017, now Pat. No. 10,229,702, which is a (Continued)

(30) Foreign Application Priority Data

Dec. 1, 2014 (JP) ................................ 2014-243327

(51) Int. Cl.
*G10L 25/90* (2013.01)
*G10L 19/12* (2013.01)
(Continued)

(52) U.S. Cl.
CPC ............. *G10L 25/90* (2013.01); *G10L 25/51* (2013.01); *G10L 25/63* (2013.01)

(58) Field of Classification Search
CPC ...................................................... G10L 15/10
See application file for complete search history.

(56) References Cited

U.S. PATENT DOCUMENTS 5,293,449 A 3/1994 Tzeng
9,286,899 B1 3/2016 Narayanan
(Continued)

FOREIGN PATENT DOCUMENTS

JP 2004-514178 A 5/2004
JP 2010-54568 A 3/2010
JP 4495907 B2 7/2010

OTHER PUBLICATIONS

International Search Report (PCT/ISA/210) issued in PCT Application No. PCT/JP2015/082435 dated Jan. 26, 2016 with English translation (3 pages).
(Continued)

*Primary Examiner* — Shreyans A Patel
(74) *Attorney, Agent, or Firm* — Crowell & Moring LLP

(57) ABSTRACT

A conversation evaluation device includes a storage medium and a processor. The storage medium stores a program configured to evaluate a conversation that includes first voice and second voice as a response to the first voice. The processor executes the program. The program causes a processor to acquire first pitch information related to the first voice. The program also causes the processor to acquire second pitch information related to the second voice. The program also causes the processor to evaluate comfortableness of the second voice based on the acquired first and second pitch information.

10 Claims, 9 Drawing Sheets

Related U.S. Application Data continuation of application No. PCT/JP2015/082435, filed on Nov. 18, 2015.

(51) Int. Cl.

| | |
|---|---|
| ***G10L 19/26*** | (2013.01) |
| ***G10L 19/08*** | (2013.01) |
| ***G10L 15/22*** | (2006.01) |
| ***G10L 25/63*** | (2013.01) |
| ***G10L 25/51*** | (2013.01) |

(56) References Cited

U.S. PATENT DOCUMENTS

| | | | |
|---|---|---|---|
| 2003/0182117 | A1 | 9/2003 | Monchi et al. |
| 2004/0002853 | A1 | 1/2004 | Clavbo |
| 2005/0003873 | A1 | 1/2005 | Naidu et al. |
| 2007/0219790 | A1 | 9/2007 | Verhelst |
| 2013/0066632 | A1 | 3/2013 | Conkie et al. |
| 2014/0025376 | A1 * | 1/2014 | Wasserblat .............. G10L 25/51 704/238 |
| 2014/0338516 | A1 | 11/2014 | Andri |

OTHER PUBLICATIONS

Japanese-language Written Opinion (PCT/ISA/237) issued in PCT Application No. PCT/JP2015/082435 dated Jan. 26, 2016 (3 pages).

Extended European Search Report issued in counterpart European Application No. 15864468.2 dated May 8, 2018 (ten (10) pages).

De Looze et al., "Investigating Automatic Measurements of Prosodic Accommodation and its Dynamics in Social Interaction", Speech Communication, Oct. 30, 2013, pp. 11-34, vol. 58, XP55470779A.

Reed B., "Conversation Analysis and Prosody", The Encyclopedia of Applied Linguistics, Nov. 5, 2012, p. 1-5, Blackwell Publishing Ltd, Oxford, UK, XP55470942A.

* cited by examiner

CONVERSATION EVALUATION DEVICE AND METHOD

CROSS REFERENCE TO RELATED APPLICATIONS

This application is a continuation of U.S. application Ser. No. 15/609,163, filed May 31, 2017, which is a 371 of International Application No. PCT/JP2015/082435, filed Nov. 18, 2015, which claims priority from Japanese Patent Application No. 2014-243327, filed Dec. 1, 2014, the disclosures of which are expressly incorporated by reference herein.

TECHNICAL FIELD

The present invention relates to a conversation evaluation device and method, as well as a storage medium storing a program for performing the conversation evaluation method.

BACKGROUND ART

Heretofore, there has been proposed a technique for analyzing a psychological state etc. of a human speaker by analyzing voice itself uttered by the speaker. Patent Literature 1, for example, proposes a technique for diagnosing a psychological state, health state, etc. of a human speaker by acquiring a voice sequence of the speaker and detecting intervals (pitch intervals) of fundamental tones present in the voice sequence.

PRIOR ART LITERATURE

Patent Literature

Patent Literature 1: Japanese Patent No. 4495907

In a conversation between at least two persons or human speakers, when one of the speakers has given a question (spoken utterance), another speaker utters some response, including backchannel feedback, to the question (spoken utterance). At that time, an impression given to the conversation partner would differ depending on with what kind of atmosphere or nuance (i.e., non-linguistic characteristic) the response is uttered, even where the response is uttered with the same wording. Thus, the technique proposed in above-identified Patent Literature 1 is constructed to analyze a psychological state etc. of a human speaker by detecting intervals (pitch intervals) in a voice sequence of the speaker. Namely, the technique proposed in Patent Literature 1 neither compares voice characteristics of a question and a response in a conversation between two persons nor evaluates a non-linguistic characteristic of a response made to a particular question. Therefore, the technique proposed in Patent Literature 1 cannot evaluate what kind of non-linguistic characteristic a response to a particular question in a conversation has.

SUMMARY OF INVENTION

In view of the foregoing prior art problems, it is an object of the present invention to provide a conversation evaluation device and method which can evaluate a non-linguistic characteristic of a response to a question (e.g., whether an impression given by the response to a conversation partner having uttered the question is good or bad) in an objective fashion, as well as a storage medium storing a program for performing the conversation evaluation method.

In evaluating a response to a question in a conversation, consideration is first given about what kind of conversation (dialogue) is carried out between persons, focusing on information other than linguistic information, particularly sound pitches (frequencies) characterizing the dialogue. As an example dialogue between persons, a case is considered in which one person ("person b") responds to an utterance (e.g., question) given by another person ("person a"). In such a case, when "person a" has uttered a question, not only "person a" but also "person b" responding to the question often tends to have a strong impression of a pitch in a particular portion of the question. When "person b" responds to the question with an intention of agreement, approval, affirmation or the like, that person utters voice of a response (response voice) in such a manner that a pitch of a portion characterizing the response has a particular relationship, more specifically a consonant-interval relationship, to the above-mentioned impressing pitch of the question (having given the strong impression to the person). Because the impressing pitch of the question of "person a" and the pitch of the portion characterizing the response of "person b" to the question are in the above-mentioned relationship, "person a" having heard the response may have a good, comfortable and reassuring impression on the response of "person b". Namely, it can be considered that, in an actual dialogue between persons, a pitch of a question and a pitch of a response to the question have a particular relationship as noted above rather than being unrelated to each other. Thus, in order to accomplish the above-mentioned object in light of the aforementioned consideration, the inventors of the present invention have developed an improved conversation evaluation system which is constructed in the following manner to appropriately evaluate a response to a question.

Namely, in order to accomplish the above-mentioned object, the present invention provides an improved conversation evaluation device, which comprises: a reception section configured to receive information related to voice of a question and information related to voice of a response to the question; an analysis section configured to acquire a representative pitch of the question and a representative pitch of the response based on the information received by the reception section; and an evaluation section configured to evaluate the response to the question based on comparison between the representative pitch of the question and the representative pitch of the response acquired by the analysis section.

Because an interval (pitch interval) of the pitch of the response relative to the pitch of the question has a close relationship with an impression that would be given by the response to a conversation partner having uttered the question, a non-linguistic characteristic of the response to the question (e.g., whether an impression given by the response to the conversation partner having uttered the question is good or bad) can be evaluated, in an objective fashion and with a high reliability, by comparison being made between the representative pitch of the question and the representative pitch of the response in accordance with the principles of the present invention.

In one embodiment of the invention, the evaluation section may be configured to: determine whether a difference value between the representative pitch of the question and the representative pitch of the response acquired by the analysis section is within a predetermined range; when the difference value is not within the predetermined range, determine a pitch shift amount on an octave-by-octave basis such that the difference value falls within the predetermined range; and shift at least one of the representative pitch of the question and the representative pitch of the response by the pitch shift amount and evaluate the response to the question based on comparison made between the representative pitch of the question and the representative pitch of the response following the pitch shifting by the pitch shift amount. Namely, according to the present invention, when the pitch of the question and the pitch of the response are away from each other by more than the predetermined range, pitch shift control is performed on the octave-by-octave basis such that the pitch difference between the question and the response falls within the predetermined range, so that the comparison between the pitch of the question and the pitch of the response can be made appropriately. Thus, even in a case where voice pitches of a question and a response are away from each other by one octave or more as in a conversation between a male and a female or between an adult and a child, the response to the question can be evaluated in an appropriate manner. In one embodiment of the invention, the evaluation section may be configured to evaluate the response to the question in terms of or based on how much a difference between the representative pitch of the question and the representative pitch of the response is away from a predetermined reference value.

In one embodiment of the invention, the conversation evaluation device may further comprise a conversation interval detection section that detects a conversation interval that is a time interval from the end of the question to the start of the response, and the evaluation section may be configured to evaluate the response to the question further based on the conversation interval detected by the conversation interval detection section. Further, as a voice characteristic, other than the pitch, of the response to the question, a time interval (conversation interval) from the end of the question to the start of the response has a close relationship with the impression that would be given by the response to the conversation partner. Thus, the present invention can evaluate the response with an even higher reliability by also evaluating the conversation interval between the question and the response.

The present invention may be constructed and implemented not only as the device or apparatus invention discussed above but also as a method invention. Also, the present invention may be arranged and implemented as a software program executable by a processor, such as a computer or a DSP (digital signal processor), as well as a non-transitory computer-readable storage medium storing such a software program. In such a case, the program may be supplied to the user in the form of the storage medium and then installed into a computer of the user, or alternatively, delivered from a server apparatus to a computer of a client via a communication network and then installed into the computer of the client. Further, the processor employed in the present invention may be a dedicated processor provided with a dedicated hardware logic circuit rather than being limited only to a computer or other general-purpose processor capable of running a desired software program.

It should be appreciated that the term “question” is used herein to refer to not only “inquiry” but also mere “spoken utterance” to another person (conversation partner) and the term “response” is used herein to refer to some kind of linguistic reaction to such a “question” (spoken utterance). In short, an utterance of one person to another person in a conversation between two or more persons is referred to as a “question”, while a linguistic reaction of the other person to the question is referred to as a “response”.

BRIEF DESCRIPTION OF DRAWINGS

Certain preferred embodiments of the present invention will hereinafter be described in detail, by way of example only, with reference to the accompanying drawings.

DESCRIPTION OF EMBODIMENTS

First Embodiment

Figure 1:
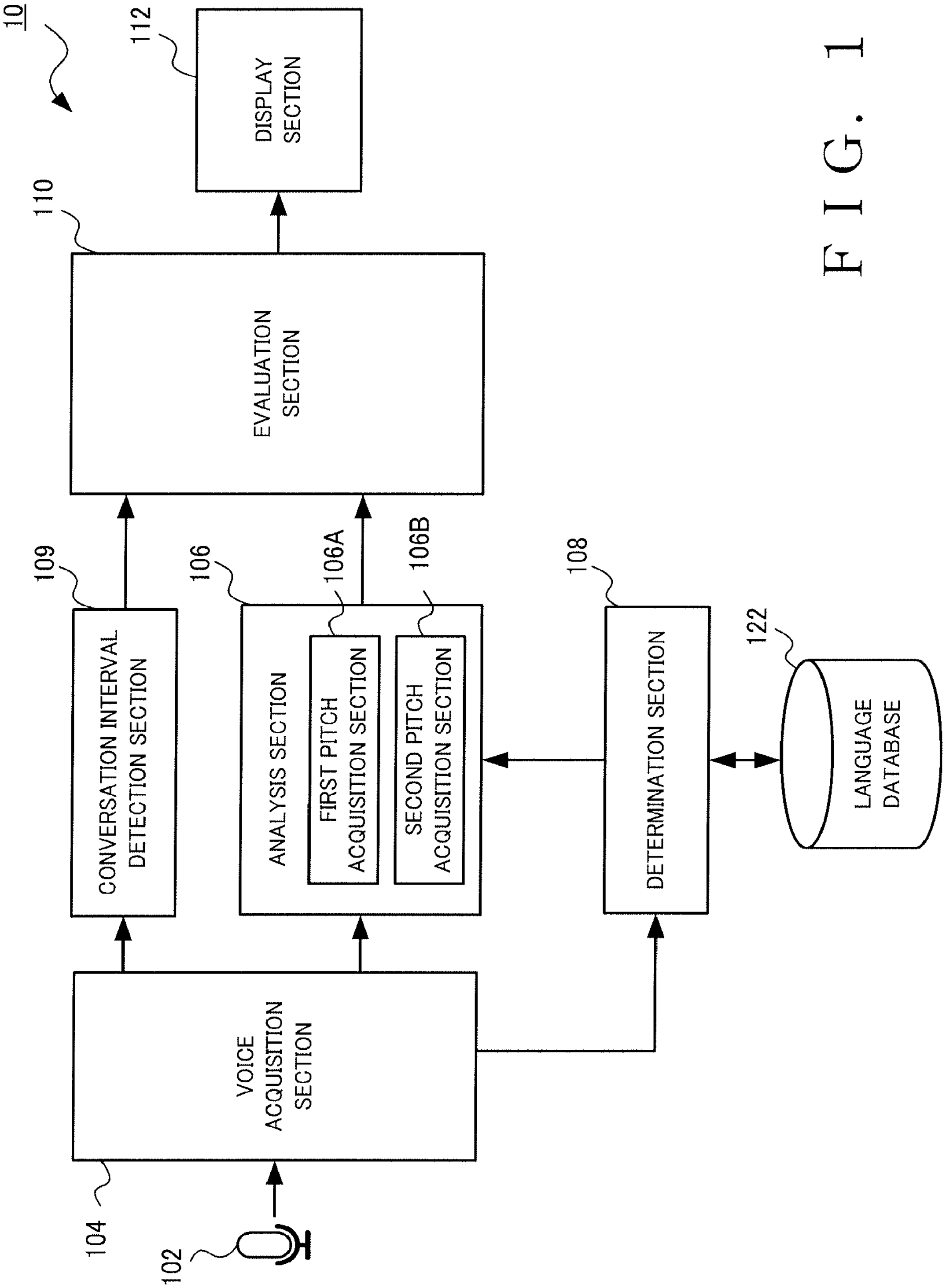
FIG. 1 is a block diagram showing a construction of a conversation evaluation device according to a first embodiment of the present invention.

FIG. 1 is a diagram showing a construction of a conversation evaluation device 10 according to a first embodiment of the present invention. The conversation evaluation device 10 will be described hereinbelow as being applied to a conversation training device which inputs voice of a conversation between two persons via a microphone of a single voice input section 102, evaluates a response to a question in the conversation and displays the evaluated response. Examples of responses to questions assumed here include answers and backchannel feedback (interjection), such as “yes”, “no”, “uh-huh”, “hmmm”, “well . . . ” and “I see”.

As shown in FIG. 1, the conversation evaluation device 10 includes a CPU (Central Processing Unit), a storage section including a memory, hard disk device, etc., a single voice input section 102, a display section 112, and other components. In the conversation evaluation device 10, a plurality of functional blocks are built as follows by the CPU executing a preinstalled application program. More specifically, in the first embodiment of the conversation evaluation device 10 are built a voice acquisition section 104, an analysis section 106, a determination section 108, a language database 122, a conversation interval detection section 109 and an evaluation section 110.

Although not particularly shown in the accompanying drawings, the conversation evaluation device 10 also includes an operation input section, etc. such that a user can input various operations to the device, make various settings, etc. Further, the conversation evaluation device 10 of the present invention may be applied a terminal device, such as a smartphone or a portable phone, a tablet-type personal computer, or the like, rather than the application of the conversation evaluation device 10 being limited to a conversation training device. Further, the conversation evaluation device 10 may be applied to a case where conversational voice of three or more persons is input via the microphone of the single voice input section 102. In such a case, when one of the persons has uttered a question, for example, any of the other persons may response to that question.

Although not described in detail, the voice input section 102 includes a microphone that converts input voice into an electric signal, and an A/D converter section that converts the converted voice signal into a digital signal in real time. The voice acquisition section 104 receives the distal signal output from the voice input section 102 and temporarily stores the received distal signal into a memory. In the first embodiment, the voice input section 102 and the voice acquisition section 104 together function as a reception section configured to receive information related to voice of a question and information related to voice of a response to the question.

The analysis section 106 performs an analysis process on the converted digital voice signal to extract voice characteristics (pitch, volume, etc.) of the utterances (question and response), and the analysis section 106 is constructed or configured to acquire a representative pitch of the question and a representative pitch of the response. As an example, the analysis section 106 includes a first pitch acquisition section 106A that detects a pitch of a particular portion of the question and acquires, on the basis of such detection, a voice characteristic (typically, a representative pitch) of the question, and a second pitch acquisition section 106B that detects a pitch included in the voice of the response and acquires, on the basis of such detection, a voice characteristic (typically, a representative pitch) of the response.

The first pitch acquisition section 106A detects a pitch of a particular portion in a voiced segment of an utterance section that lasts from the utterance start to the utterance end in the voice signal of the question (i.e., representative pitch of the question), and then it supplies the evaluation section 110 with data indicative of the detected pitch (representative pitch) of the question. The particular portion in the voiced segment of the utterance section is a representative portion suited for extraction of a pitch-related characteristic possessed by the question. As an example, the particular portion (representative portion) is a trailing end portion of a predetermined time length (e.g., 180 msec) immediately preceding the end of the utterance, and the first pitch acquisition section 106A detects, as the representative pitch, the highest pitch in the trailing end portion. Such a particular portion (representative portion) is not limited to the trailing end portion and may be either the whole or a part of the utterance section. Alternatively, the lowest pitch, average pitch or the like, other than the highest pitch, in the particular portion (representative portion) may be detected as the representative pitch.

In the case where voice is input in real time as in the instant embodiment, the start of the voice utterance can be identified, for example, by determining that the volume of the voice signal has reached a threshold value or over, and the end of the voice utterance can be identified, for example, by determining that the volume of the voice signal has remained below a threshold value for a predetermined time period. Note that, in order to prevent chattering, a plurality of threshold values may be used to impart a hysteresis characteristic. Further, the term "voiced segment" refers to a segment of the utterance section where a pitch of the voice signal is detectable. Such a pitch-detectable segment means that the voice signal has a cyclic portion and a pitch in this cyclic portion is detectable.

If a trailing end portion of a voiced segment of a question is unvoiced sound (i.e., sound involving no vibration of the vocal band), a pitch of the unvoiced sound may be estimated from the preceding voiced sound portion. Further, the particular portion (representative portion) of the question is not necessarily limited to the trailing end portion of the voiced segment and may be, for example, a beginning-of-word portion of the voiced segment. Further, arrangements may be made to allow the user to set as desired of which portion of the question a pitch should be identified. As another alternative, only any one of volume and pitch, rather than both of volume and pitch, may be used for the voiced segment detection, and which of volume and pitch should be used for the voiced segment detection may be selected by the user.

The second pitch acquisition section 106B detects a pitch of the response on the basis of the voice signal of the response and acquires, on the basis of the detected pitch, a representative pitch (e.g., average pitch of the utterance section) of the voice of the response. Then, the second pitch acquisition section 106B supplies the evaluation section 110 with data indicative of the acquired representative pitch of the response. Note that the second pitch acquisition section 106B may acquire, as the representative pitch, the highest or lowest pitch in an entire section or predetermined partial section of the voice of the response, rather than the average pitch. Alternatively, the second pitch acquisition section 106B may acquire, as the representative pitch, an average pitch in a predetermined partial section of the voice of the response. As another alternative, the second pitch acquisition section 106B may acquire, as the representative pitch, a pitch trajectory itself in an entire section or predetermined partial section of the voice of the response.

Further, in performing processes related to the first and second pitch acquisition sections 106A and 106B, the analysis section 106 may detect a particular portion and a pitch of the particular portion by use of a voice signal stored by the voice acquisition section 104 into the memory. Alternatively, the analysis section 106 may detect a pitch of the question by use of a voice signal received in real time via the voice acquisition section 104. For example, in the case where a pitch of the question is to be detected in real time, a pitch of the input voice signal is compared against a preceding pitch of the voice signal, and the higher of the compared pitches is stored in an updating manner. Such operations are continued till the end of the utterance of the question, so that the ultimately updated pitch is identified as the pitch of the question. In this way, the highest pitch detected till the end of the utterance can be identified as the pitch of the question. Further, in the case where a pitch of the response is to be detected, it may be identified on the basis of syllables of the response. Where the response is backchannel feedback, for example, a pitch in or around the second syllable of the response tends to be close to an average pitch of the entire response, and thus, a pitch at the beginning of the second syllable may be identified as the pitch of the response.

The determination section 108 analyzes the voice signal of the utterance converted into the digital signal, performs speech recognition on the digital voice signal for converting the voice signal into a character string, and thereby identify the meaning of a spoken word or words of the utterance. Thus, the determination section 108 determines whether the utterance is a question or a response and then supplies the analysis section 106 with data indicative of a result of the determination. In determining meaning of the utterance, the determination section 108 determines, with reference to phoneme models pre-created in the language database 122, which phoneme the voice signal of the utterance is close to, and thereby identify the meaning of the word or words defined by the voice signal. The hidden Markov models may be used as the phoneme models.

Note that the determination by the determination section 108 as to whether the utterance is a question or a response may be made on the basis of a non-linguistic characteristic, rather than on the basis of the linguistic meaning analysis as set forth above. For example, if the utterance has a rising pitch in its ending-of-word portion, it can be determined to be a question. If voice of the next utterance has two syllables, the next utterance can be determined to be a response in the form of backchannel feedback. Normally, if an utterance is a question, then the next utterance is a response to the question. Therefore, it suffices that the determination section 108 can at least determine whether an utterance is a question or not. In such a case, the utterance following the utterance having determined to be a question is automatically regarded as a response to the question.

By the way, in the case where a response is made to a question in a dialogue between two persons, a time interval (conversation interval) from the end of the question to the start of the response may be one factor to be considered in addition to the pitches. For example, in responding "No" to a question uttered by one person as if pressing for an either-or response, the person may often take time, as if pausing a moment, to be sufficiently careful, which is an act often seen empirically. To a question uttered by one person like "Who", "What", "When", "Where", "Why" or "How", not pressing for an either-or response, on the other hand, the other person may sometimes take time to respond with specific content. In any case, if a time interval from the end of the question to the start of the response is relatively long, a kind of uneasy feeling may be given to the person having uttered the question, but also the subsequent conversation may not become lively. Conversely, if the time interval from the end of the question to the start of the response is too short, the person having uttered the question may have a feeling as if the question were consciously overlapped by the response of the other person or as if the other person were not earnestly listening to the person having uttered the question. Thus, the person having uttered the question may be given a discomfort feeling.

In view of the foregoing, the instant embodiment is constructed in such a manner that, in evaluating a response to a question, it can measure and evaluate a time interval (also referred to as "conversation interval") from the end of the question to the start of the response in addition to measuring and evaluating the pitch. More specifically, the conversation interval detection section 109 detects a time interval (conversation interval) from the end of the question to the start of the response by use of a timer or real-time clock built in the conversation evaluation device 10. In the case where the timer is used for the time counting purpose, the timer starts counting time in response to the end of the question and stops counting time in response to the start of the response, so that the time interval between the end of the question and the start of the response is detected as the conversation interval. In the case where the real-time clock is used for the time counting purpose, the respective times of the end of the question and the start of the response are acquired, and then a time interval between the two times is detected as the conversation interval. Time data indicative of the detected conversation interval is supplied to the evaluation section 110 so that the time data is evaluated, together with the aforementioned pitch data of the question and response, by the evaluation section 110.

The evaluation section 110 evaluates the response to the question on the basis of the pitch data of the question and response supplied from the analysis section 106 and the time data supplied from the conversation interval detection section 109, and thereby calculates evaluation points or scores. More specifically, for the pitch data, the evaluation section 110 calculates a difference (pitch interval) between the representative pitches of the question and response and calculates a pitch evaluation score on the basis of how much the calculated difference (pitch interval) is different or away from a predetermined reference value. Likewise, for the time data indicative of the conversation interval, the evaluation section 110 calculates a conversation interval evaluation score on the basis of how much the time length of the conversation interval is away from a predetermined reference value (reference time interval). Then, the evaluation section 110 calculates a sum of the pitch evaluation score and the conversation interval evaluation score as an ultimate evaluation score of the response and visually displays the ultimate evaluation score on the display section 112. Thus, the person having made the response can check the evaluation of the response. Details of the response evaluation by the evaluation section 110 will be discussed later.

Figure 2:
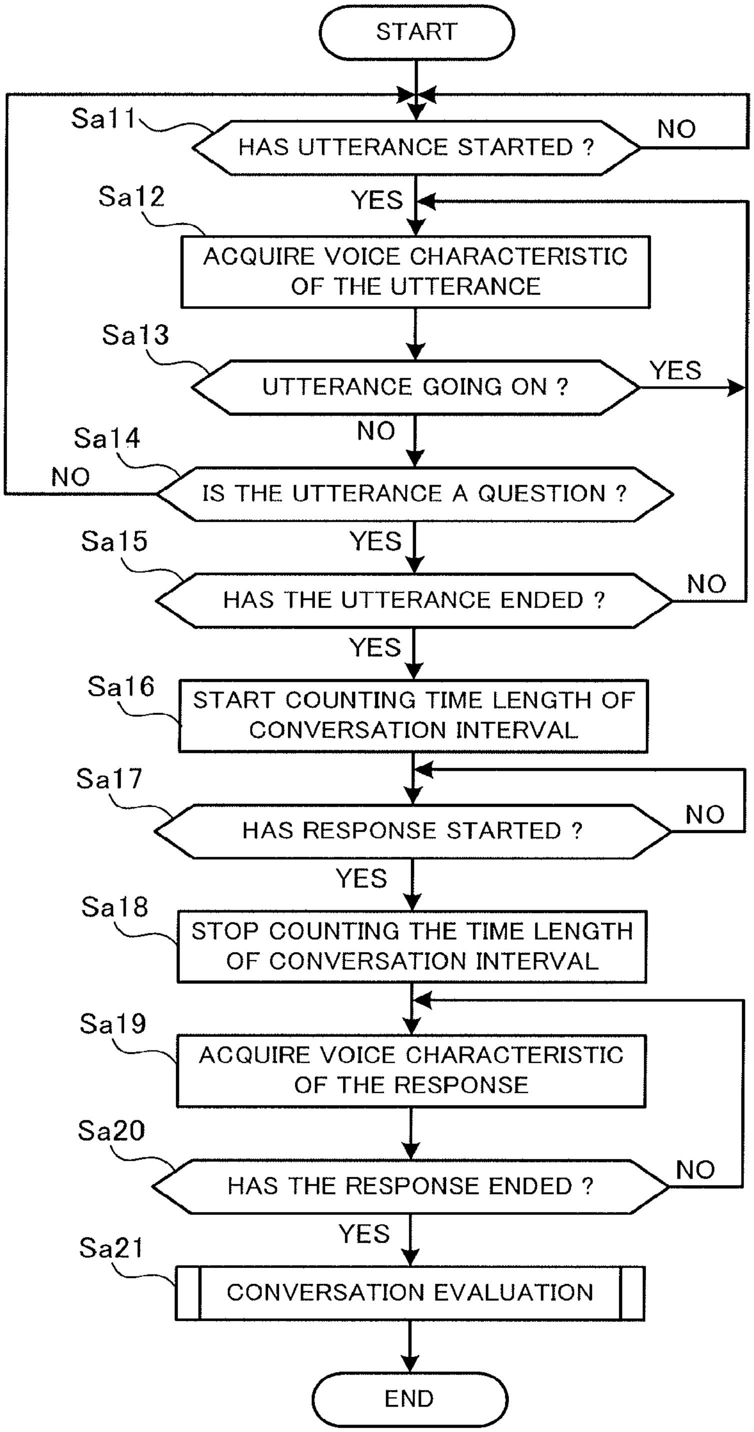
FIG. 2 is a flow chart of example main routine processing performed in the conversation evaluation device shown in FIG. 1.

Next, a description will be given about operation of the first embodiment of the conversation evaluation device 10. FIG. 2 is a flow chart showing processing performed in the first embodiment of the conversation evaluation device 10. The CPU of the conversation evaluation device 10 activates an application program corresponding to the processing in response to the user performing a predetermined operation, e.g. selecting on a main menu screen (not shown) an icon or the like corresponding to the processing. By executing the application program, the CPU builds the functional blocks shown in FIG. 1.

Here, the operation of the conversation evaluation device 10 will be described in relation to a case where voice of a natural conversation between two persons is input via the microphone of the single voice input section 102, and where the conversation evaluation device 10 evaluates a response to a question while acquiring characteristics of voice in real time. In the case where a natural conversation is input via the single voice input section 102 like this, there is a need to determine whether an utterance is a question or not, because whether the utterance is a question or not cannot be identified clearly via the single voice input section 102. Here, for convenience of description, let it be assumed that, if the utterance has been determined to be a question, an utterance immediately following the question is automatically regarded as a response and thus no particular determination process is performed as to whether the immediately following utterance is a response or not. However, the conversation evaluation device 10 is not so limited and may be constructed to perform a particular determination process for determining whether the utterance immediately following the utterance having been determined to be a question is a response or not.

First, at step Sa11, a voice signal converted by the voice input section 102 is supplied via the voice acquisition section 104 to the analysis section 106, where a determination is made as to whether an utterance has been started. The determination as to whether an utterance has been started is made by determining whether the volume of the voice signal has reached the threshold value or over. Note that the voice acquisition section 104 stores the voice signal into a memory.

Upon determination at step Sa11 that an utterance has been started, the processing goes to step Sa12, where the first acquisition section 106A of the analysis section 106 performs the pitch analysis process on the voice signal, supplied via the voice acquisition section 104, for acquiring a pitch of the utterance as a voice characteristic. Unless it is determined at step Sa11 that an utterance has been started, step Sa11 is repeated until it is determined that an utterance has been started.

At step Sa13, the analysis section 106 determines whether the utterance is still going on, by determining whether the voice signal with the volume equal to or greater than the threshold value is still lasting. Upon determination at step Sa13 that the utterance is still going on, the processing reverse to step Sa12, where the acquisition section 106A of the analysis section 106 performs the pitch analysis process on the voice signal for acquiring a pitch of the utterance. Upon determination at step Sa13 that the utterance is not going on, on the other hand, the processing goes to step Sa14, where a determination is made as to whether the latest utterance has been determined to be a question by the determination section 108. If the latest utterance is not a question as determined at step Sa14, the processing reverts to step Sa11 to await the start of a next utterance.

If the last utterance is a question as determined at step Sa14, on the other hand, a determination is made at step Sa15 as to whether the utterance (question) has ended, for example, by determining whether or not a state where the volume of the voice signal is below a predetermined threshold value has lasted for a predetermined time.

If the utterance (question) has not ended as determined at step Sa15, the processing reverts to step Sa12 so that the pitch analysis process for acquiring a pitch of the utterance is continued. Once the first pitch acquisition section 106A acquires a pitch (e.g., the highest pitch in an ending-of-word portion) of the utterance (question) through the analysis process on the voice signal, it supplies pitch data of the question to the evaluation section 110.

If the utterance (question) has ended as determined at step Sa15, on the other hand, the processing proceeds to step Sa16, where the conversation interval detection section 109 starts counting a time length of a conversation interval.

Then, at step Sa17, a determination is made as to whether a response to the question has been started. Because the question has already ended, the next utterance is a response, and thus, whether a response has been started is determined by determining whether the volume of the voice signal following the end of the question has reached a threshold value or over.

If a response has been started as determined at step Sa17, the conversation interval detection section 109 stops counting the time length of the conversation interval, at step Sa18. In the aforementioned manner, it is possible to measure the time length of the conversation interval from the end of the question to the start of the response. Then, the conversation interval detection section 109 supplies the evaluation section 110 with data indicative of the measured time length of the conversation interval.

At step Sa19, the second pitch acquisition section 106B of the analysis section 106 performs the analysis process on the voice signal from the voice acquisition section 109 for acquiring a pith of the response as a voice characteristic.

At next step Sa20, a determination is made at step Sa15 as to whether the response has ended, for example, by determining whether or not a state where the volume of the voice signal is below a predetermined threshold value has lasted for a predetermined time.

If the response has not ended as determined at step Sa20, the processing reverts to step Sa19, where the pitch analysis process for acquiring a pitch of the response is continued. Once the second pitch acquisition section 106B acquires a pitch (e.g., an average pitch) of the response through the analysis process on the voice signal, and it supplies pitch data of the response to the evaluation section 110. Once it is determined at step Sa20 that the response has ended, the processing reverts to step Sa21, where the evaluation section 110 evaluates the conversation.

Figure 3:
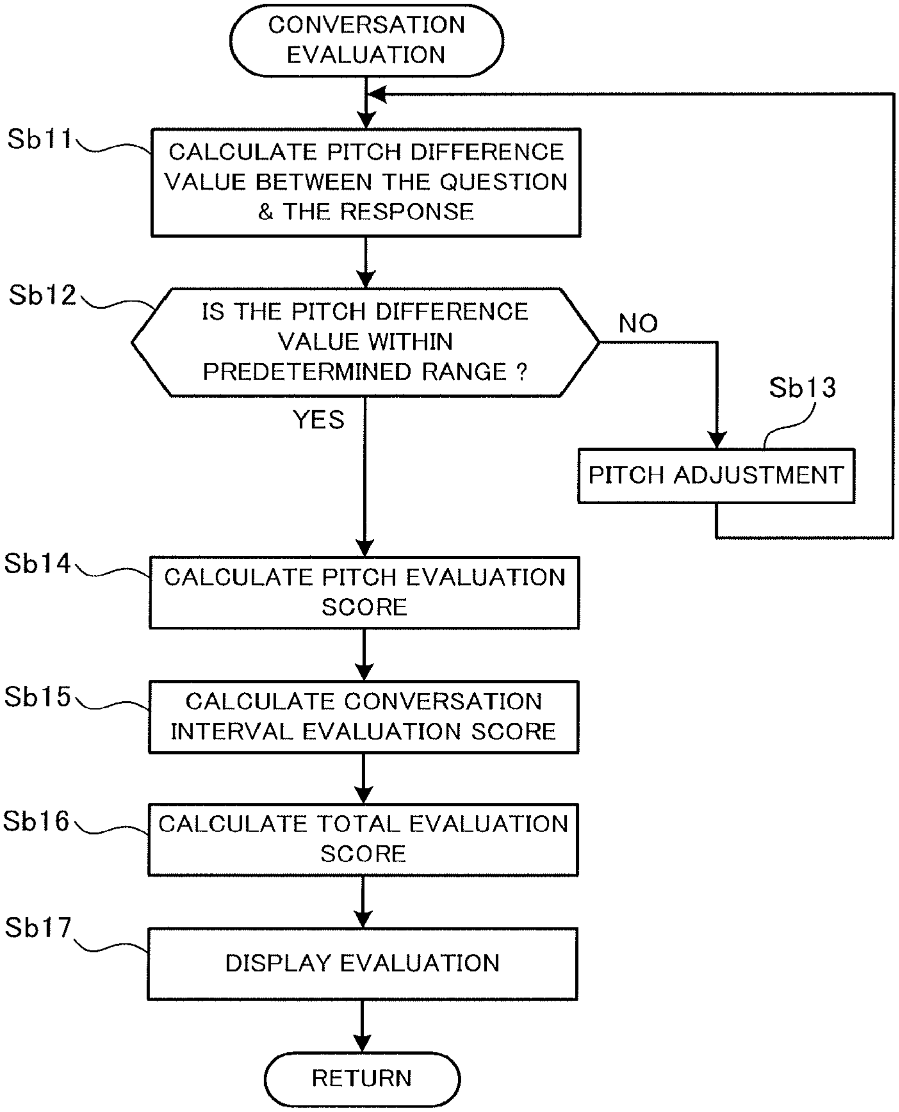
FIG. 3 is a flow chart of a conversation evaluation sub routine shown in FIG. 2.

FIG. 3 is a flow chart showing details of the conversation evaluation process at step Sa21 of FIG. 2. First, at step Sb11, the evaluation section 110 a difference value between the pitch (representative pitch) of the question and the pitch (representative pitch) of the response on the basis of the pitch data of the question acquired from the first pitch acquisition section 106A and the pitch data of the response acquired from the second pitch acquisition section 106B; the aforementioned difference value (pitch difference value) is an absolute value of a pitch subtraction value calculated by subtracting the pitch of the response from the pitch of the question.

At next step Sb12, the evaluation section 110 determines whether the calculated pitch difference value is within a predetermined range. If the calculated pitch difference value is outside the predetermined range as determined at step Sb12, the evaluation section 110 adjusts the pitch of the response at step Sb13. More specifically, the evaluation section 110 determines a pitch shift amount of the pitch of the response on an octave-by-octave basis so that the pitch difference value falls within the predetermined range (e.g., within a range of one octave). Then, the evaluation section 110 adjusts the pitch of the response by the pitch shift amount, after which the processing reverts to step Sb11 so that the evaluation section 110 re-calculates a pitch difference value between the pitch of the question and the adjusted or shifted pitch of the response. Thus, even in a case where there is a pitch difference of one octave or more in natural voice between persons as in a conversation between a person having high-pitched natural voice (like a female or a child) and a person having low-pitched natural voice (like a male), the evaluation section 110 can adjust the pitch difference in natural voice between the persons and thereby appropriately evaluate the response to the question. Note that the evaluation section 110 configured in this manner can appropriately evaluate a response to a question not only in the conversation between a male and a female but also in a conversation between males or between females which might sometimes involve a pitch difference of one octave or more in natural voice.

At step Sb13, the evaluation section 110 may adjust the pitch of the response on an octave-by-octave basis until the pitch difference value falls within the predetermined range (e.g., within the range of one octave). Whereas the foregoing description has been made in relation to the case where the pitch of the response is adjusted with the pitch of the question left unadjusted, the present invention is not so limited. The pitch of the question may be adjusted with the pitch of the response left unadjusted, or both of the pitch of the question and the pitch of the response may be adjusted.

If the pitch difference value is within the predetermined range as determined at step Sb12, the evaluation section 110 calculates, at step Sb14, a pitch evaluation point (score) on the basis of the pitch subtraction value calculated by subtracting the pitch of the response from the pitch of the question. At that time, if the pitch adjustment has been executed at step Sb13 as noted above, the evaluation section 110 calculates the pitch evaluation score using the pitch subtraction value calculated based on the adjusted pitch. Because the pitch subtraction value is calculated by subtracting the pitch of the response from the pitch of the question, it becomes a positive (plus) value when the pitch of the response is lower than the pitch of the question, but it becomes a negative (minus) value when the pitch of the response is higher than the pitch of the question. This is for the purpose of giving a higher evaluation to the case where the pitch of the response is lower than the pitch of the question than the case where the pitch of the response is higher than the pitch of the question. The pitch evaluation score is calculated at step Sb14 in terms of or based on how much the pitch subtraction value is away from a predetermined reference value. Let it be assumed, for example, that the predetermined reference value is 700 cents and that a full score (100 points) is given when the pitch subtraction value is 700 cents. In such a case, the pitch evaluation score of the response to the question is calculated by reducing the score more as the pitch subtraction value gets farther away (or deviates more) from the 700-cent reference value. Namely, the closer to 100 points the pitch evaluation score is, the better the response to the question can be evaluated. Note that the evaluation score may be increased as the pitch subtraction value gets closer to the predetermined reference value.

Then, at step Sb15, the evaluation section 110 calculates a conversation interval evaluation score on the basis of the time data indicative of the conversation interval supplied from the conversation interval detection section 109. The conversation interval evaluation score is calculated at step Sb15 based on how much the time length of the conversation interval from the end of the question to the start of the response is away from a predetermined reference value. Let it be assumed, for example, that the predetermined reference value is 180 msec and that a full score (100 points) is given when the time length of the conversation interval is 180 msec. In this case, the conversation interval evaluation score is calculated by reducing the score more as the time length of the conversation interval gets farther away (or deviates more) from the 180-msec reference value. Namely, the closer to 100 points the conversation interval evaluation score is, the better the response to the question can be evaluated. Note that the conversation interval evaluation score may be increased as the time length of the conversation interval gets closer to the predetermined reference value.

Then, at step Sb16, the evaluation section 110 calculates a total evaluation score on the basis of the pitch evaluation score and conversation interval evaluation score of the response to the question. The total evaluation score is calculated by simply adding together the pitch evaluation score and the conversation interval evaluation score. Alternatively, the total evaluation score may be calculated by first adding predetermined weights to the weighting the pitch evaluation score and the conversation interval evaluation score and then adding together the thus-weighted pitch evaluation score and conversation interval evaluation score.

Then, the evaluation section 110 displays on the display section 112 a result of the evaluation (evaluation result) of the response to the question at step Sb17, after which the processing reverts to step Sa21 of FIG. 2. More specifically, only the total evaluation score is displayed as the evaluation result on the display section 112. Thus, the evaluation of the response to the question can be checked as the evaluation score in an objective fashion. Note that the pitch evaluation score and the conversation interval evaluation score, rather than only the total evaluation score, may be displayed separately on the display section 112.

Further, as the display of the evaluation score of the response to the question, not only the numerical value of the evaluation score but also a graphic, symbol or mark, such as an illumination or animation, corresponding to the evaluation score may be displayed on the display section 112. Further, the evaluation result of the response to the question may be indicated or informed in any other suitable manner than being visually displayed on the screen of the display section 112 as noted above. For example, in the case where the conversation evaluation device 10 is applied to a portable terminal, the evaluation result may be informed using a vibration function or a sound generation function to vibrate the conversation evaluation device 10 in a vibration pattern corresponding to the evaluation score or to generate audible sound corresponding to the evaluation score.

Further, in the case where the conversation evaluation device 10 is applied to a toy, such as a stuffed toy, or a robot, the evaluation result of the response to the question may be indicated or informed by motion (gesture) of the stuffed toy or robot. For example, if the evaluation score is high, the stuffed toy or robot may be caused to make delighted motion, whereas if the evaluation score is low, the stuffed toy or robot may be caused to make disappointed motion. In this way, conversation training based on responses to questions can be carried out in a more enjoyable way.

The following describe in more details, with reference to the accompanying drawings, the pitch adjustment performed (at steps Sb12 and Sb13) by the evaluation section 110 in the instant embodiment. More specifically, the following describe the pitch adjustment while comparing a case where a pitch difference value between a question and a response is within a range of one octave (and thus no pitch adjustment is to be executed) and a case where a pitch difference value between a question and a response is not within a range of one octave (and thus pitch adjustment is to be executed).

Figure 4:
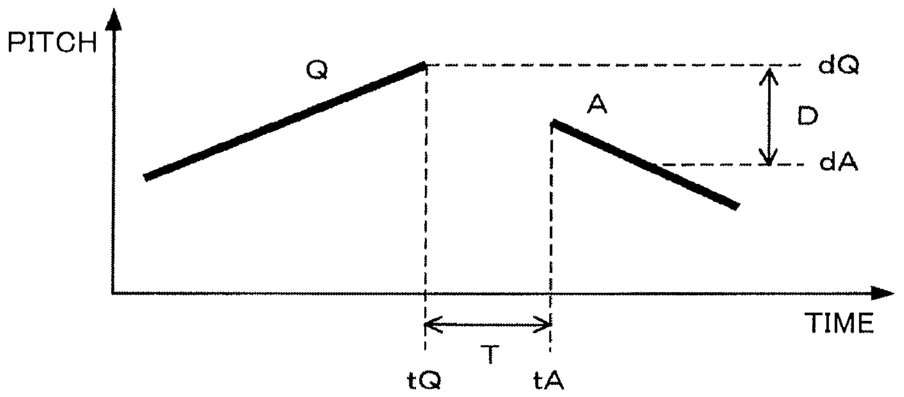
FIG. 4 is a diagram showing example pitches of a question and a response in the first embodiment.
Figure 5:
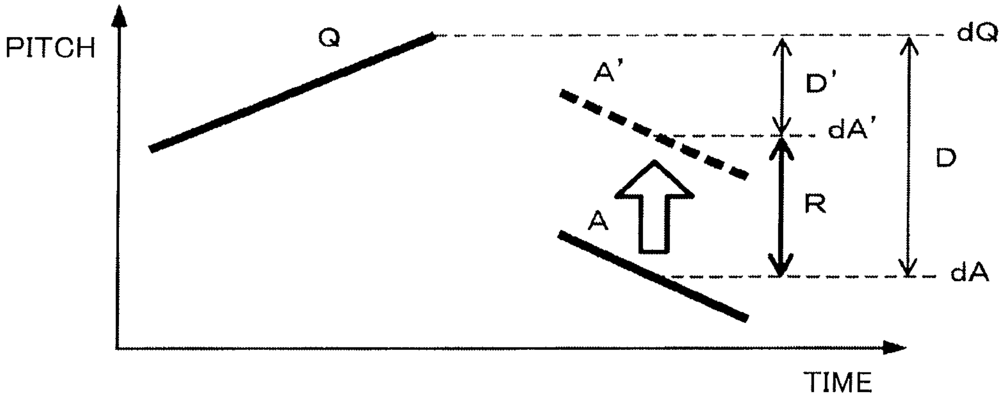
FIG. 5 is a diagram showing example pitches of a question and a response in the first embodiment and more particularly showing a case where there is a pitch difference of one octave or more between the question and the response.

FIGS. 4 and 5 are each a diagram showing relationship between input voice of a question and input voice of a response to the question with the vertical axis representing the pitch and the horizontal axis representing the time. More specifically, FIG. 4 shows the relationship in the case where a pitch difference value between the question and the response is within the one-octave range, and FIG. 5 shows the relationship in the case where the pitch difference value between the question and the response is not within the one-octave range.

Further, in FIGS. 4 and 5, solid lines indicated by reference character Q each schematically show, in a straight line, a pitch variation of the question. Reference character dQ indicates a pitch of a particular portion in the question Q (e.g., highest pitch of an ending-of-word portion in the question Q). Further, in FIG. 4, solid lines indicated by reference character A each schematically show, in a straight line, a pitch variation of a response to the question Q, and reference character dA indicates an average pitch of the response A. Reference character D indicates a difference value between the pitch dQ of the question Q and the pitch dA of the response A. Further, in FIG. 4, reference character tQ indicates an end time of the question, and reference character tA indicates a start time of the response. Furthermore, reference character T indicates a time interval between tQ and tA, i.e. from the end of the question Q to the start of the response A.

In FIG. 5, a broken line indicated by reference character A' shows, in a straight line, a pitch variation of the response A after having been subjected to pitch adjustment to be shifted by one octave. Reference character dA' indicates an average pitch of such a pitch-adjusted response A'. Reference character D' indicates a difference value between the pitch dQ of the question and the average pitch dA' of the pitch-adjusted response A'.

In the illustrated example of FIG. 4, the pitch difference value D is within the one-octave (i.e., 1200 cents) range, so that no pitch adjustment is required. Thus, after the pitch difference value D is calculated at step Sb11, a pitch evaluation score is calculated at step Sb14, without step Sb13 being executed, on the basis of the pitch subtraction value obtained by subtracting the pitch dA of the response A from the pitch dQ of the question Q. Because the pitch dA of the response A is lower than the pitch dQ of the question Q, the pitch subtraction value in this case is a positive (plus) value and thus identical to the pitch difference value D.

In the illustrated example of FIG. 5, on the other hand, the pitch difference value D exceeds one octave (1200 cents), so that pitch adjustment is required. In the illustrated example of FIG. 5, the pitch of the response A is far lower than the pitch of the question Q as in a case where one person having high natural voice utters the question Q and another person having natural voice lower than that of the one person by one octave or more utters the response A. Thus, even when the two persons utter same voice with same volume, if there is a pitch difference of one octave or more between the respective natural voice of the two persons, the evaluation score of the response would greatly differ due to such a pitch difference in the respective natural voice as long as the response is evaluated with the pitch difference left unadjusted, so that appropriate evaluation of the response may not be possible. Thus, in the instant embodiment, the pitch dA of the response A is adjusted, at step Sb13 of FIG. 3, to the pitch dA' of the response A' by being shifted upward by one octave R. Thus, the pitch difference value D' between the pitch dQ of the question Q and the thus-adjusted pitch dA' of the response is reduced to within the one-octave (1200 cents) range. In this way, it is possible to minimize influences of speech mechanisms of the persons and thereby calculate an appropriate pitch evaluation score. Note that the pitch adjustment may be executed by shifting the pitch of the response downward on the octave-by-octave basis rather than shifting the pitch of the response upward on the octave-by-octave basis as above.

Figure 6:
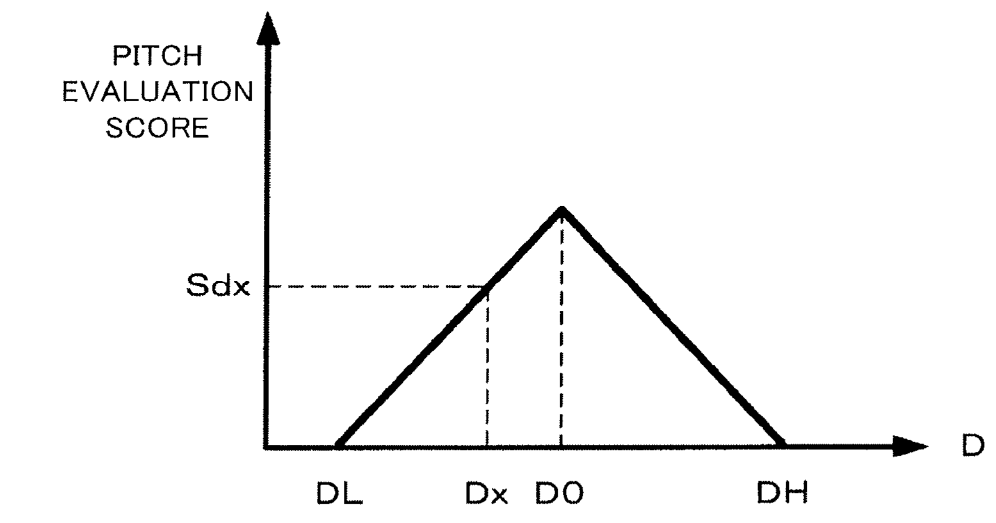
FIG. 6 is a diagram explanatory of a rule for calculating a pitch evaluation point in the first embodiment.

The following describe in more details, with reference to the accompanying drawings, the pitch evaluation score calculation performed (at step Sb14) by the evaluation section 110 in the instant embodiment. FIG. 6 is a diagram explanatory of a scheme or rule for calculating the pitch evaluation score, where the horizontal axis represents the pitch subtraction value D between the question and the response and the vertical axis represents the pitch evaluation score. In FIG. 6, reference character D0 indicates a reference value of the pitch subtraction value which is, for example, 700 cents. A solid line in FIG. 6 indicates a reference line for pitch evaluation score calculation. The reference line for pitch evaluation score calculation is expressed as a straight line such that the pitch evaluation score decreases as the pitch subtraction value D deviates more from the pitch reference value D0 either in a direction where the pitch subtraction value D increases relative to the pitch reference value or in a direction where the pitch subtraction value D decreases relative to the pitch reference value D0. More specifically, the reference line for pitch evaluation score calculation is set in such a manner that the pitch evaluation score becomes zero outside a predetermined range from the reference value D0 (i.e., outside the range from a lower limit value DL to an upper limit value DH). Thus, if it is assumed, for example, that the pitch evaluation score is calculated as the full score (100 points) when the pitch subtraction value is equal to the reference value D0, the pitch evaluation score decreases as the pitch subtraction value deviates more from the reference value D0 within the predetermined range (i.e., the range from the lower limit value DL to the upper limit value DH), and the pitch evaluation score is calculated as zero when the pitch subtraction value is outside the predetermined range (i.e., outside the range from the lower limit value DL to the upper limit value DH). Note that whereas the reference line for pitch evaluation score calculation is shown in FIG. 6 as having a line-symmetric shape with respect to an imaginary straight line parallel to the vertical axis and passing through the reference value D0, the reference line for pitch evaluation score calculation need not necessarily be of a line-symmetric shape. For example, the straight line of the reference line for pitch evaluation score calculation may be inclined differently (in different angles) between a region of the straight line preceding the reference value D0 and a region of the straight line following the reference value D0. Further, the reference line for pitch evaluation score calculation need not necessarily be a straight line and may be a curved line. Furthermore, the reference line for pitch evaluation score calculation may be of a non-linear shape rather than a linear shape.

Let's assume a case where, in calculating a pitch evaluation score by use of the reference line for pitch evaluation score calculation shown in FIG. 6, the pitch subtraction value calculated by subtracting the pitch of the response A from the pitch of the question Q is "Dx". In this case, Sdx corresponding to the value Dx in accordance with the reference line for pitch evaluation score calculation becomes adding points or deducting points. Thus, assuming that an initial pitch evaluation score is zero point, a pitch evaluation score can be calculated by adding (or subtracting) the adding (or deducting) points to (or from) the initial zero-point score.

It is preferable that the reference value D0 of the pitch subtraction value be set such that the response to the question has an optimal pitch. In the instant embodiment, the reference value D0 is set at 700 cents as noted above, which is a pitch subtraction value that causes the pitch of the response to be an about 5th below the pitch of the question, i.e. that causes the pitch of the response to be in a consonant interval relationship to the pitch of the question. Namely, it is preferable that the reference value D0 be set at such a pitch subtraction value as to allow the pitch of the response to assume a consonant interval relationship to the pitch of the question. Because, generally, in a conversation between persons, when one person gives a fully affirming response to a question made by another person, and if a pitch subtraction value calculated by subtracting the pitch of the response from the pitch of the question is closer to a consonant interval relationship, the response can be made a more appropriate response that imparts a good, comfortable and reassuring impression. Thus, the closer to the reference value the pitch subtraction value calculated by subtracting the pitch of the response from the pitch of the question is, the better the response to the question can be evaluated. Also note that the relationship of the pitch of the response to the pitch of the question is not necessarily limited to the consonant interval relationship of the about 5th below the pitch of the question and may be any other consonant interval relationship than the about 5th below the pitch of the question, such as perfect octave, perfect 5th, perfect 4th, major 3rd, minor 3rd, major 6th or minor 6th. Further, the relationship of the pitch of the response to the pitch of the question is not necessarily limited to such a consonant interval relationship and may be a non-consonant interval relationship because some non-consonant interval relationships are empirically known to be capable of imparting a good impression.

Figure 7:
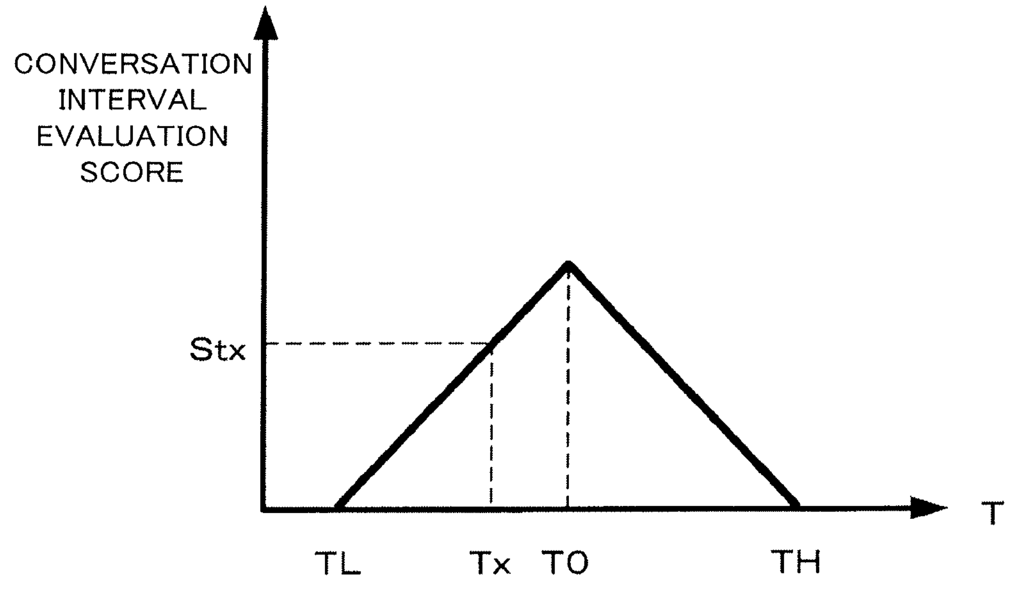
FIG. 7 is a diagram explanatory of a specific example of a rule for calculating a conversation interval evaluation score in the first embodiment.

The following describe in more details, with reference to the accompanying drawings, the conversation interval score calculation performed (at step Sb15) by the evaluation section 110 in the instant embodiment. FIG. 7 is a diagram explanatory of a specific example of a scheme or rule for calculating the conversation interval evaluation score, where the horizontal axis represents the time length T of the conversation interval and the vertical axis represents the conversation interval evaluation score. In FIG. 7, reference character T0 indicates a reference value of the conversation interval evaluation (also referred to as "reference time interval") that is, for example, 180 msec. A solid line in FIG. 7 represents a reference line for conversation interval evaluation score calculation in a straight line such that the conversation interval evaluation score decreases as the time length T of the conversation interval deviates more from the reference value T0 either in a direction where the time length T increases or in a direction where the time length L decreases. More specifically, the reference line for conversation interval evaluation score calculation is set in such a manner that the conversation interval evaluation score becomes zero outside a predetermined range from the reference value T0 (i.e., outside the range from a lower limit value TL to an upper limit value TH). Thus, assuming that that the conversation interval evaluation score is calculated as the full score (100 points) when the time length L of the conversation interval is equal to the reference value T0, the conversation interval evaluation score decreases as the time length TL deviates more from the reference value T0 within the predetermined range (i.e., the range from the lower limit value TL to the upper limit value TH), and the conversation interval evaluation score is calculated as zero when the time length TL is outside the predetermined range (i.e., outside the range from the lower limit value TL to the upper limit value TH). Note that whereas the reference line for conversation interval evaluation score calculation is shown in FIG. 7 as having a line-symmetric shape with respect to an imaginary straight line parallel to the vertical axis and passing through the reference value T0, the reference line for conversation interval evaluation score calculation need not necessarily be of a line-symmetric shape. For example, the straight line of the reference line for conversation interval evaluation score calculation may be inclined differently (in different angles) between a region of the straight line preceding the reference value T0 and a region of the straight line following the reference value T0. Further, the reference line for conversation interval evaluation score calculation need not necessarily be a straight line and may be a curved line. Further, the reference line for conversation interval evaluation score calculation may be of a non-linear shape rather than a linear shape.

Let's assume a case where, in calculating a conversation interval evaluation score by use of the reference line for conversation interval evaluation score calculation shown in FIG. 7, the time length of the conversation interval from the question Q to the response A is "Tx". In this case, Stx corresponding to the value Tx in accordance with the reference line for conversation interval evaluation score calculation becomes adding points or deducting points. Thus, assuming that an initial conversation interval evaluation score is zero point, a conversation interval evaluation score can be calculated by adding (or subtracting) the adding (or deducting) points to (or from) the initial zero-point score.

It is preferable that an optimal time length in a region from the end of the question to the start of the response be set as the reference value T0 of the time length of the conversation interval. In the instant embodiment, the reference value T0 is set, for example, at 180 msec as noted above, because 180 msec is a conversation interval time length that allows the response to the question to give a good, comfortable and reassuring impression to the conversation partner. Thus, the closer to the reference value T0 the time length of the conversation interval from the end of the question to the start of the response is, the better the response to the question can be evaluated.

Each of the reference value D0 of the pitch subtraction value and the reference value T0 of the conversation interval time length (i.e., the reference time interval T0) is not necessarily limited to a reference value for evaluating the fully affirming response to the question. Namely, the reference value T0 of the conversation interval time length may be changed in accordance with a particular type of response to the question, such as a response with a particular feeling like an angry response or a lukewarm response, so that the response can be evaluated even more appropriately in accordance with the type of response. In evaluating the angry response, for example, the reference value T0 of the conversation interval time length may be made shorter than that (180 msec) for the fully affirming response. In this way, a degree of the angriness of the response to the question can be evaluated. Further, in evaluating the lukewarm response, the reference value T0 of the conversation interval time length may be made longer than that (180 msec) for the fully affirming response. In this way, a degree of the lukewarmness of the response to the question can be evaluated.

Further, pluralities of the aforementioned reference values D0 of the pitch subtraction value and reference values T0 of the conversation interval time length may be provided in association with various types of response noted above. For example, the reference value (reference time interval) for the fully affirming response, the reference value (reference time interval) for the angry response and the reference value (reference time interval) for the lukewarm response may be provided separately.

Further, the volume as well as the pitch may be evaluated as voice characteristics of the question and response. More specifically, respective volume of the question and response is acquired as voice characteristics of the question and response, a difference value between the volume of the question and the volume of the question is calculated, and a volume evaluation score is calculated based on how much the calculated difference value is away from a predetermined reference value. The thus-calculated volume evaluation score is added to the aforementioned pitch evaluation score and conversation interval evaluation score to thereby calculate a total evaluation score. The aforementioned reference value of the volume difference value (reference volume value) too may be changed in accordance with the type of response, or a plurality of such reference volume values may be provided in association with different types of response.

For example, for the lukewarm response, the reference volume value is made lower than for the fully affirming response, so that a degree of the lukewarmness of the response to the question can be evaluated.

Further, in a case where voice of questions and voice of responses have been input repeatedly and evaluation scores have been calculated for individual ones of the responses, evaluation scores calculated for the individual responses may be added at aforementioned steps Sb14, Sb15 and Sb16 of FIG. 3.

As detailed above, the conversation evaluation device 10 according to the first embodiment of the invention can evaluate a voice characteristic of a response to a question by comparison against a voice characteristic of the question. Thus, with the conversation evaluation device 10, an impression of the response that would be imparted to the conversation partner can be checked in an objective fashion. Because a pitch of the question and a pitch of the response as respective voice characteristics of the question and response have a close relationship with impressions that would be imparted to the conversation partners, the conversation evaluation device 10 can perform highly reliable evaluation of the response to the question by evaluating the pitch of the response through comparison against the pitch of the question. In addition to the pitch, a time interval (conversation interval) from the end of the question to the start of the response, as other respective voice characteristics of the question and response, too has a close relationship with impressions that would be imparted to the conversation partner. Thus, the conversation evaluation device 10 can perform even more reliable evaluation of the response to the question by evaluating not only the pitch of the question and response but also the conversation interval between the question and the response.

Note that in the case where the first embodiment of the conversation evaluation device 10 is applied to a terminal device, such as a smartphone or a portable phone, input of voice and acquisition of voice characteristics may be performed by the terminal device, and evaluation of a conversation may be performed by an external server connected with the terminal device via a network. Alternatively, input of voice may be performed by the terminal device, and acquisition of voice characteristics and evaluation of a conversation may be performed by the external server.

Second Embodiment

Figure 8:
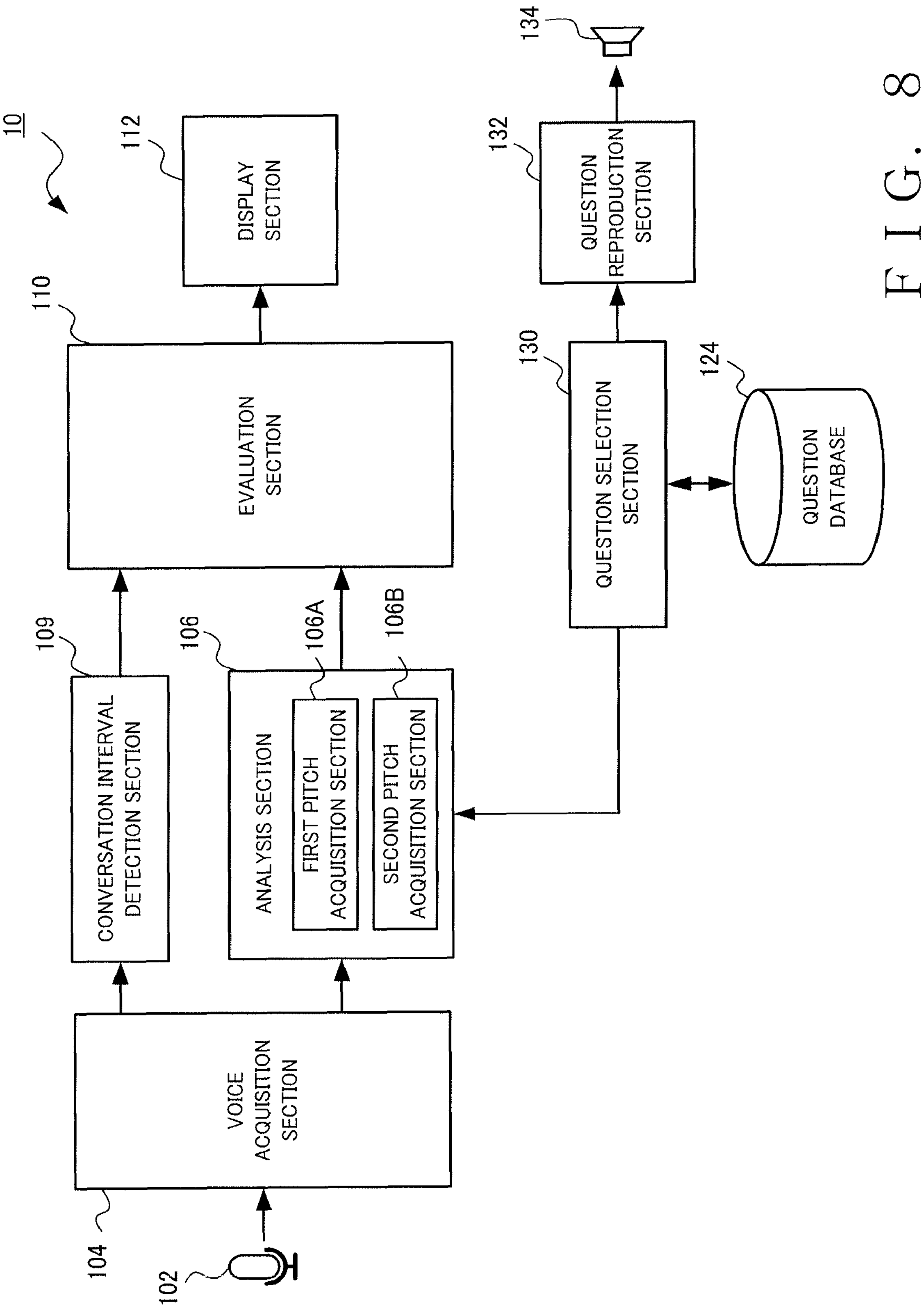
FIG. 8 is a block diagram showing a construction of a conversation evaluation device according to a second embodiment of the present invention.

Next, a second embodiment of the present invention will be described. FIG. 8 is a block diagram showing a construction of a conversation evaluation device 10 according to the second embodiment of the present invention. The first embodiment has been described above in relation to the case where a response uttered by a person in response to a question uttered by another person is input via the microphone of the single voice input section 102 and then the input response is evaluated. In the second embodiment, however, a response uttered by a person in response to a question reproduced by a speaker 134 through voice synthesis is input and evaluated. Note that elements in the second embodiment having similar functions to those in the first embodiment of the conversation evaluation device 10 are indicated by the same reference numerals as in the first embodiment and will not be described here in detail to avoid unnecessary duplication.

The second embodiment of the conversation evaluation device 10 includes a question selection section 130, a question reproduction section 132 and a question database 124. Note that the determination section 108 and the language database 122 shown in FIG. 1 are not provided in the second embodiment of the conversation evaluation device 10. Because, in the second embodiment of the conversation evaluation device 10, voice data of a question (question voice data) with a predetermined pitch is selected and audibly reproduced via the speaker 134, and thus, there is no need to determine whether the utterance is a question or not.

The question database 125 prestores a plurality of question voice data (i.e., voice data of a plurality of questions). Such question voice data are recordings of various voice uttered by a model person. For each of the question voice data, which are for example in the way or mp3 format, a pitch of each waveform sample (or each waveform cycle) when reproduced in a standard manner and a representative pitch (e.g., highest pitch of an ending-of-word portion) of a particular portion (representative portion) are determined in advance, and data indicative of the representative pitch of the particular portion is prestored in the question database library 124 in association with the voice data. Note that "reproduced in a standard manner" means reproducing the voice data under the same conditions (i.e., at the same pitch, same volume, same utterance rate and the like) as when the voice data was recorded.

Note that question voice of same content uttered by individual ones of a plurality of persons A, B, C, . . . may be prestored as question voice data in the question database 124. For example, these persons A, B, C, . . . may be a famous person (celebrity), a talent, a singer, etc., and the question voice data are prestored in the question database 124 in association with such different persons. For prestoring the question voice data in the question database 124 in association with such different persons as noted above, the question voice data may be prestored in the question database 124 by way of a storage medium, such as a memory card, or alternatively, the conversation evaluation device 10 may be equipped with a network connection function such that question voice data can be downloaded from a particular server into the question database 124. Further, the question voice data may be acquired from the memory card or the server either on a free-of-charge basis or on a paid basis.

Further, arrangements may be made such that the user can select, via the operation input section or the like, which of the persons should be a model of question voice data. Alternatively, which of the persons should be a model of question voice data may be determined randomly for each of various different conditions (date, week, month, etc.). As another alternative, voice of the user itself and voice of family members and acquaintances of the user recorded via the microphone of the voice input section 102 (or converted into data via another device) may be prestored as question voice data in the database. Thus, when a question is uttered in the voice of such a person close to the user, the user can have a feeling as if having a dialogue with that close person.

The question selection section 130 selects one of the question voice data from the question database 124 and reads out and acquires the selected question voice data together with the representative pitch data associated therewith. The question selection section 130 supplies the acquired question voice data to the question reproduction section 132 and supplies the acquired representative pitch data to the analysis section 106. The question selection section 130 may select one question voice data from among the plurality of question voice data in accordance with any desired rule; for example, the question selection section 130 may select one question voice data in a random manner or via a not-shown operation section. The question reproduction section 132 audibly reproduces the question voice data, supplied from the question selection section 130, via the speaker 134.

Figure 9:
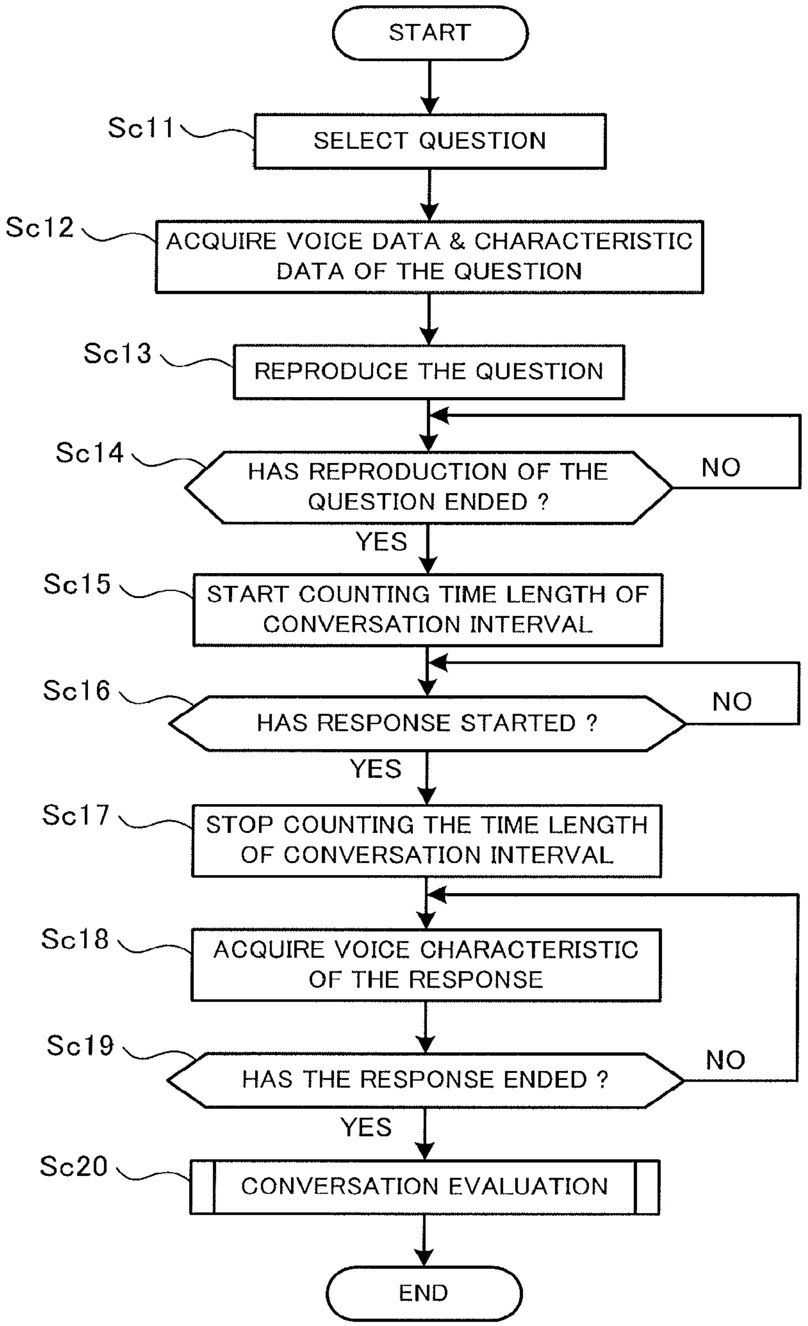
FIG. 9 is a flow chart of example main routine processing performed in the conversation evaluation device shown in FIG. 8.

Next, a description will be given about operation of the second embodiment of the conversation evaluation device 10. FIG. 9 is a flow chart showing processing performed in the second embodiment of the conversation evaluation device 10. First, at step Sc11, the question selection section 130 selects a question from the database 124. Then, at step Sc12, the question selection section 130 acquires the voice data and characteristic data (pitch data) of the selected question. The question selection section 130 supplies the acquired question voice data to the question reproduction section 132 and supplied the acquired pitch data to the analysis section 106. Then, the first pitch acquisition section 106A of the analysis section 106 acquires the representative pitch data supplied from the question selection section 130 and supplies the acquired representative pitch data to the evaluation section 110.

At following step Sc13, the question reproduction section 132 audibly reproduces the selected question voice data via the speaker 134. Then, at step Sc14, a determination is made as to whether the reproduction of the question has ended. If the reproduction of the question has ended as determined at step Sc14, counting a time length of a conversation interval is started. After that a response utterance process is performed at steps Sc16 to Sc20 in a similar manner to the response utterance process (steps Sa17 to Sa21) shown in FIG. 2.

In such a second embodiment of the conversation evaluation device 10, voice of a question is audibly reproduced via the speaker 134, and once voice of a response to the question is input via the microphone of the voice input section 102, an evaluation value (score) of the response is displayed on the display section 112. Because the question is audibly reproduced via the speaker 134 in this embodiment, the user can practice uttering a response to the question by himself or herself even where there is no conversation partner uttering the question. Further, because the question is audibly reproduced via the speaker 134, it just suffices to input only the response via the microphone of the voice input section 102, which can eliminate the need to determine whether the utterance input from the voice input section 102 is a question or not.

Note that the first pitch acquisition section 106A of the analysis section 106 may be constructed to analyze question voice data selected by the question selection section 130 without invention of the voice input section 102, calculate an average pitch of the question voice data when reproduced in the standard manner and then supply the evaluation section 110 with data indicative the calculated average pitch as representative pitch data. Such a construction can eliminate the need to prestore the representative pitch data in the database 124 in association with the question voice data.

In the above-described second embodiment, the voice input section 102 and the voice acquisition section 104 together function as a reception section that receives a sound signal of voice of a response, and the question selection section 130 and the first pitch acquisition section 106A together function as a reception section that receives voice-synthesis-related data (the aforementioned stored representative pitch data or selected question voice data) related to data for synthesizing voice of a question.

As a modification of the second embodiment, voice of a question may be input via the microphone of the voice input section 102 and voice of a response to the question may be audibly reproduced via the speaker 134 through voice synthesis, conversely to the above-described. In such a case, the voice input section 102 and the voice acquisition section 104 together function as a reception section that receives a sound signal of voice of a question, and the question selection section 130 and the second pitch acquisition section 106B together function as a reception section that receives voice-synthesis-related data (stored representative pitch data or selected response voice data) related to data for synthesizing voice of a response.

Third Embodiment

Figure 10:
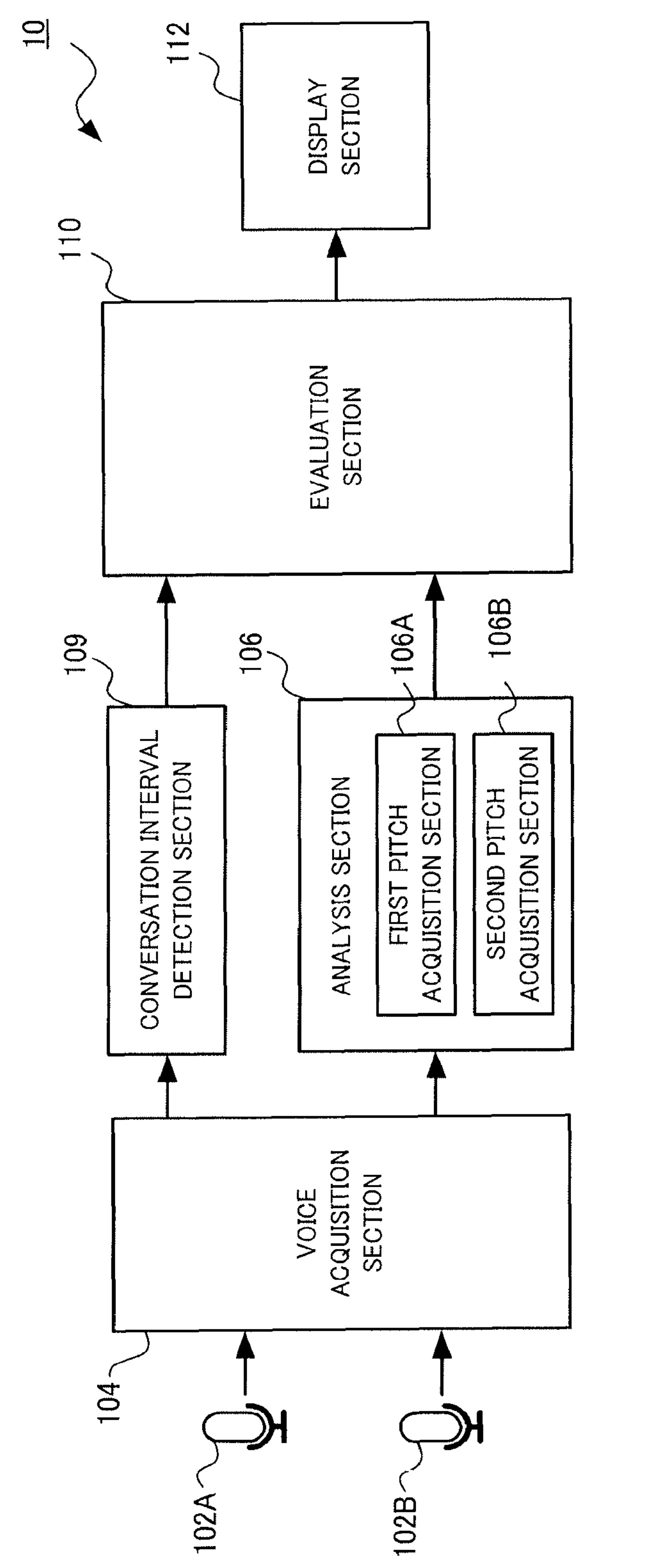
FIG. 10 is a block diagram showing a construction of a conversation evaluation device according to a third embodiment of the present invention.

Next, a third embodiment of the present invention will be described. FIG. 10 is a block diagram showing a construction of a conversation evaluation device 10 according to the third embodiment of the present invention. The first embodiment has been described above in relation to the case where voice of a conversation between two persons is input via the microphone of the single voice input section 102. In the third embodiment, however, voice of a conversation between two persons is input separately via respective microphones of two voice input sections 102A and 102B. Note that elements in the third embodiment having similar functions to those in the first embodiment of the conversation evaluation device 10 are indicated by the same reference numerals as in the first embodiment and will not be described here in detail to avoid unnecessary duplication.

The determination section 108 and language database 122 shown in FIG. 1 are not provided in the third embodiment of the conversation evaluation device 10. Because, the third embodiment of the conversation evaluation device 10 is constructed in such a manner that voice of individual persons is input via the separate (question-only and response-only) voice input sections 102A and 102B, and thus, there is no need to perform a particular determination operation as to whether an utterance is a question or not, as long as a person uttering a question uses the question-only voice input section 102A and a person uttering a response uses the response-only voice input section 102B. In the third embodiment, the voice input sections 102A and 102B and the voice acquisition section 104 together function as a reception section configured to separately receive a sound signal of voice of a question and a sound signal of voice of a response.

Figure 11:
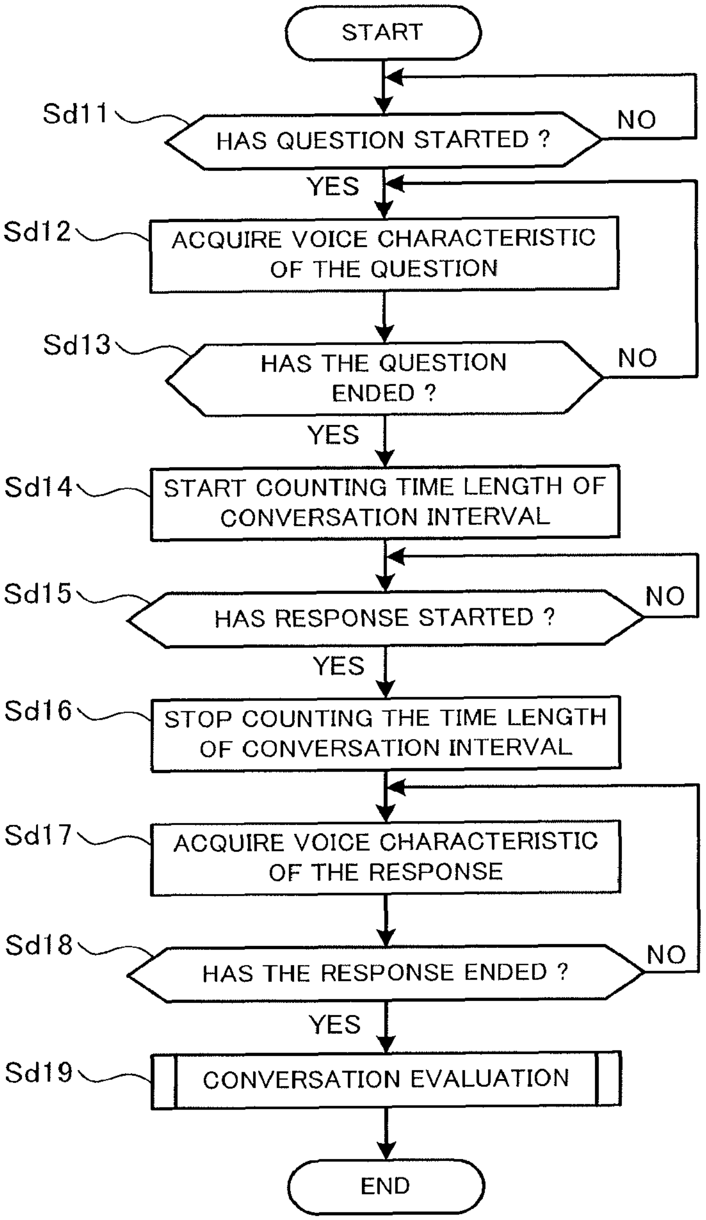
FIG. 11 is a flow chart of example main routine processing performed in the conversation evaluation device shown in FIG. 10.

Next, a description will be given about operation of the third embodiment of the conversation evaluation device 10. FIG. 11 is a flow chart showing processing performed in the third embodiment of the conversation evaluation device 10, which is similar to the flow chart of FIG. 2 except that the operation for determining whether an utterance is a question or not in the flow chart of FIG. 2 is not included in the flow chart of FIG. 11. Further, steps Sd11, Sd12 and Sd13 shown in FIG. 11 are similar to steps Sa11, Sa12 and Sa15 shown in FIG. 2, except that the word “utterance” appearing at steps Sa11, Sa12 and Sa15 in FIG. 2 is replaced with the word “question” in FIG. 11. Steps Sd14 to Sd19 shown in FIG. 11 are similar to steps Sa16 to Sa21 shown in FIG. 2.

In such a third embodiment of the conversation evaluation device 10, once voice of a question is input via the microphone of the voice input section 102A, voice of a response to the question is input via the microphone of the other voice input section 102B. Thus, the input voice of the response to the input voice of the question is evaluated by the analysis section 106 and the evaluation section 110, and a resultant evaluation value (score) of the response is displayed on the display section 112. Because the question and response are input separately via the respective microphones of the voice input sections 102A and 102B, the third embodiment of the conversation evaluation device 10 can eliminate the need to determine whether the utterance input from each of the voice input sections 102A and 102B is a question or not.

What is claimed is:

1. A conversation evaluation device comprising:

a storage medium storing a program configured to evaluate a conversation that includes first voice and second voice as a response to the first voice; and a processor configured to execute the program, wherein when executed the program causes the processor to:

acquire first pitch information related to the first voice;

acquire second pitch information related to the second voice; and evaluate comfortableness of the second voice based on the acquired first and second pitch information, wherein the evaluate comfortableness of the second voice includes calculating a score based on a pitch difference between the first pitch information and the second pitch information, the score is calculated based on a comparison between the pitch difference and a predetermined reference value, and the predetermined reference value is a value indicative of a consonant interval.

2. A computer-implemented method of evaluating a conversation that includes first voice and second voice as a response to the first voice, comprising:

acquiring first pitch information related to the first voice;

acquiring second pitch information related to the second voice; and evaluating comfortableness of the second voice based on the acquired first and second pitch information, wherein evaluating comfortableness of the second voice includes calculating a score based on a pitch difference between the first pitch information and the second pitch information, the score is calculated based on a comparison between the pitch difference and a predetermined reference value, and the predetermined reference value is a value indicative of a consonant interval.

3. The computer-implemented method as claimed in claim 2, wherein the consonant interval is an interval where the second pitch is a 5th below the first pitch.

4. The computer-implemented method as claimed in claim 2, wherein acquiring first pitch information includes detecting a highest pitch, a lowest pitch, or an average pitch in a trailing end portion of the first voice, and the first pitch information is indicative of the detected pitch.

5. The computer-implemented method as claimed in claim 2, wherein the second pitch information is indicative of a highest or lowest pitch or an average pitch in the second voice.

6. The computer-implemented method as claimed in claim 2, further comprising notifying a user of the evaluated comfortableness via one of a display, a vibration, a sound, or a motion.

7. The conversation evaluation device as claimed in claim 1, wherein the consonant interval is an interval where the second pitch is a 5th below the first pitch.

8. The conversation evaluation device as claimed in claim 1, wherein the acquire first pitch information includes detecting a highest pitch, a lowest pitch, or an average pitch in a trailing end portion of the first voice, and the first pitch information is indicative of the detected pitch.

9. The conversation evaluation device as claimed in claim 1, wherein the second pitch information is indicative of a highest or lowest pitch or an average pitch in the second voice.

10. The conversation evaluation device as claimed in claim 1, further comprising one of a display, a vibration, a sound, or a motion that is configured to notify a user of the evaluated comfortableness.

* * * * *